Patented May 29, 1923.

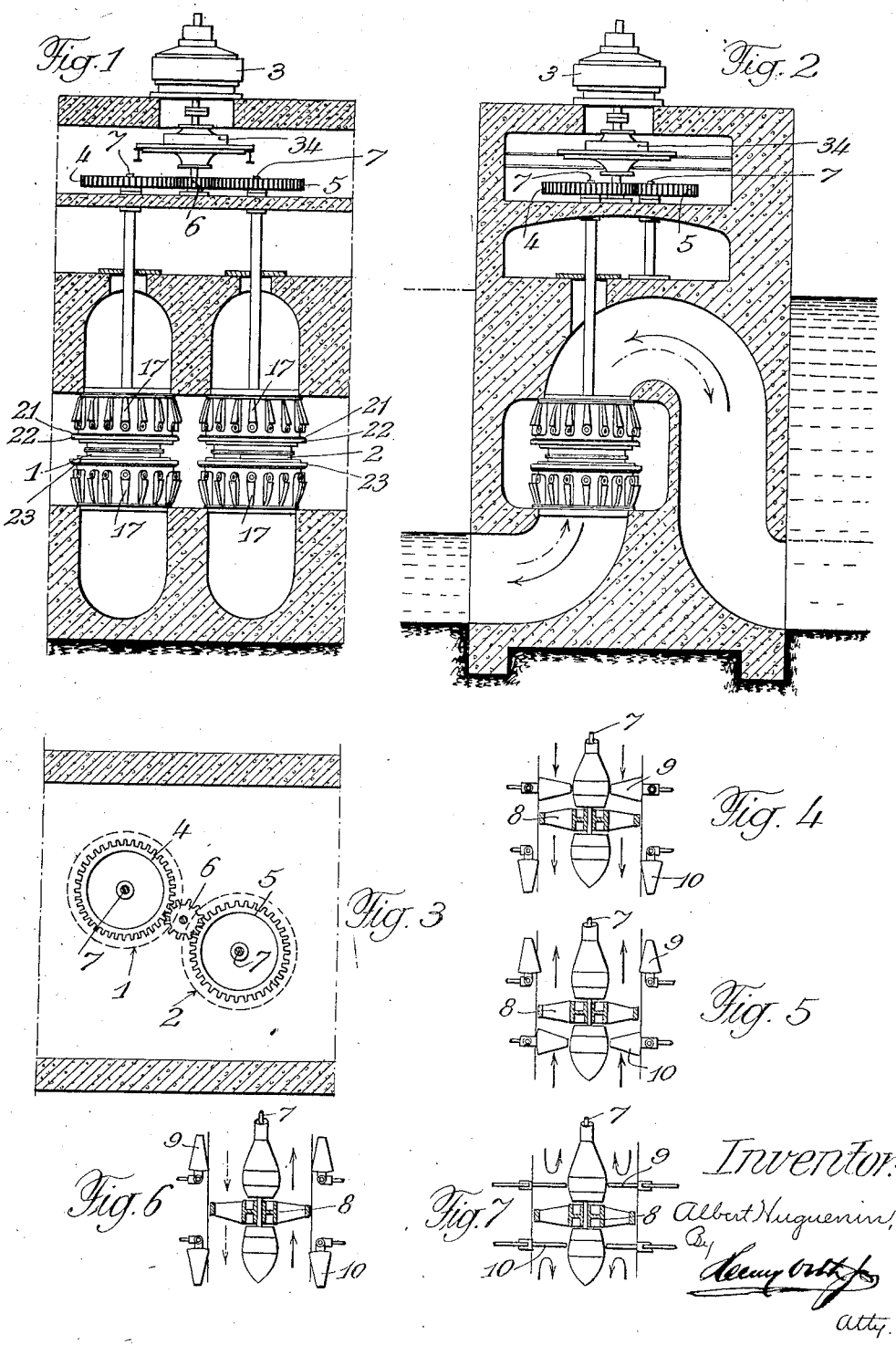

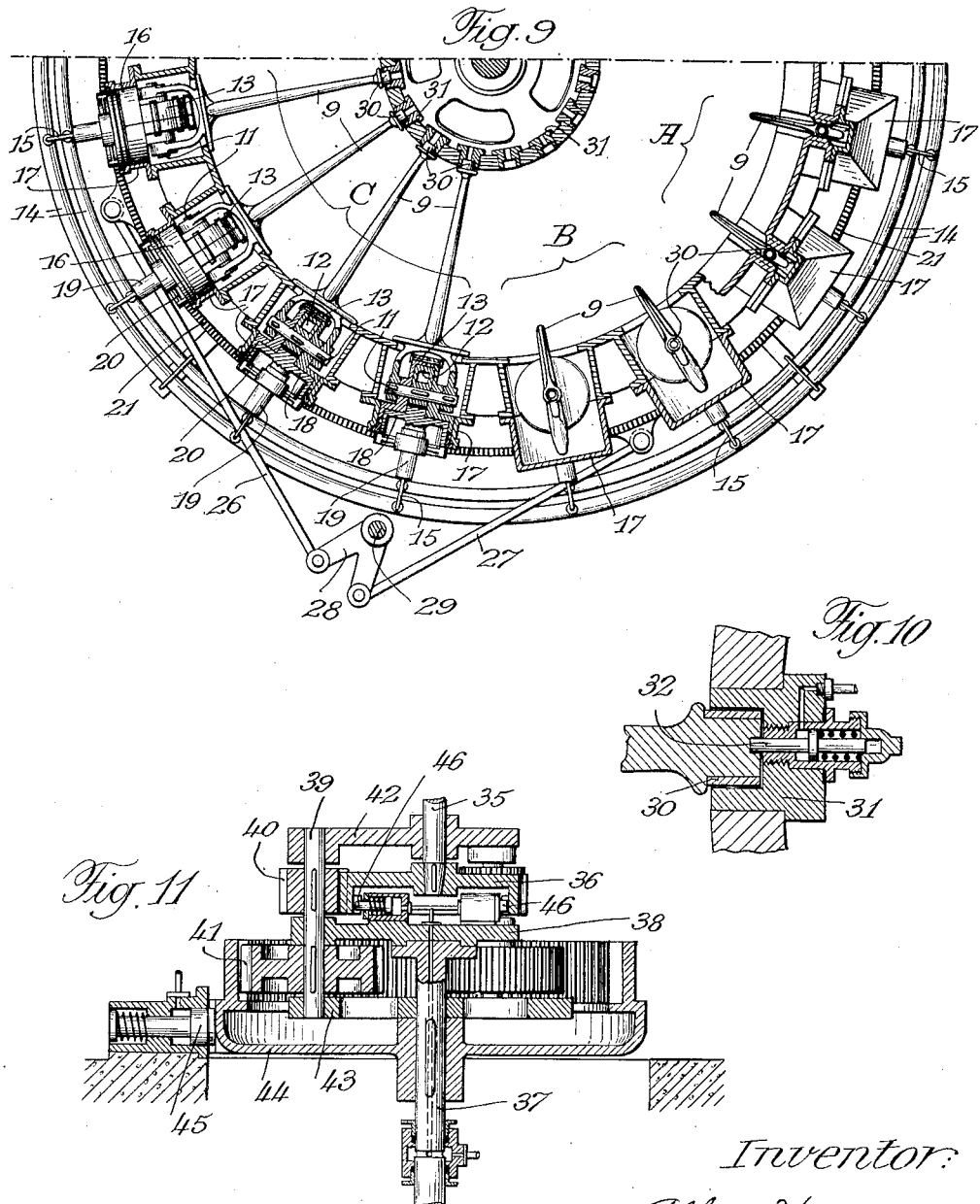

1,457,170

UNITED STATES PATENT OFFICE.

ALBERT HUGUENIN, OF ZURICH, SWITZERLAND.

TIDAL WATER-POWER PLANT.

Application filed October 5, 1921. Serial No. 505,511.

*To all whom it may concern:*

Be it known that I, ALBERT HUGUENIN, citizen of the Republic of Switzerland, residing at Zurich, Switzerland, have invented certain new and useful Improvements in Tidal Water-Power Plants, of which the following is a specification, reference being had therein to the accompanying drawing.

This invention has reference to the exploitation of tidal-water-powers and particularly to a method and means of working a tidal-water-power plant having its driving motor built into the dam the water passages of which are traversed by the water in periodically opposite directions. In my copending application Ser. No. 505510 I have disclosed a method of working a tidal water power plant of the aforementioned type which method consists in this that in each aggregate of the system composed of asynchronous generators and turbines and for the purpose of rendering the current generated constant in voltage and in periodicity, the variation in speed of the turbine caused by a variation in the water-head, is counteracted by an alteration in the working conditions of certain parts of the aggregates, the operation being such that after a definite minimum water head has been reached first of all, those members of the turbine which actually impede the flow of the water are removed from the supply passage and the aggregate is then set to work as a motor-pump so as to effect a speedy re-adjustment of the water-level difference, after which the water passages between the dam and the turbine are closed by members of the turbine.

In the above mentioned application No. 505510 said alteration of the working conditions of certain parts of the aggregate may be effected by an alteration in the electrical connections of the asynchronous generators for instance by changing the connection of the poles of a generator or by establishing a cascade connection between two adjacent generators.

According to the present invention the method of working a tidal power plant consists in alterating the working conditions of certain parts of the aggregate by effecting an alteration in the transmission ratio between the turbine and the asynchronous generator.

Preferably said alteration in the transmission ratio between the turbine and the asynchronous generator is effected by mechanically altering the transmission ratio between the shafts of the turbine and of the generator. The means for effecting said alteration may consist of a mechanical change speed gear interposed between said shafts or of an electromagnetically operated gear box with a variable speed transmission ratio as described in the British Patent No. 129271.

The designed form of turbine provided for carrying out these operations according to the method of the invention consists of an axial flow turbine furnished with two independent controllable guide-apparatus or distributors which can be put in or out of action, and only one of which, when working in one of the two directions of rotation is in action and the other out of action.

For the purpose of giving a completely free passage to the water through every turbine channel it is convenient that both guide-apparatus may be put out of action together.

Within the limits of control, at least one of these apparatus may be completely shut down so that a water tight obturation of every turbine channel can be effected.

An example for the practical carrying out of this method of working is represented in the accompanying drawings, in which:

Fig. 1 is a vertical section taken longitudinally through the dam through two units of the system and Fig. 2 is a vertical section taken transversely to the dam through one unit.

Fig. 3 is a plan of Fig. 1.

Fig. 4 shows diagrammatically the position of the guide apparatus for one direction of rotation of the turbine when working.

Fig. 5 shows these guide-apparatus in the position occupied when the turbine is rotating in the other direction.

Fig. 6 represents both apparatus out of action for the purpose of securing a free through passage for the water and Fig. 7 shows both apparatus in closed position to effect a water-tight obturation of the turbine channels.

Fig. 9 is a plan of one half of the turbine in which two guide vanes marked A are shown in a section along line I—I of Fig. 8, two guide vanes marked B are shown in a section along line II—II of Fig. 8 and four vanes marked C are shown in a section along line III—III of Fig. 8.

Fig. 10 is a detail of a device for securing a guide vane in its operative position.

Fig. 11 shows a vertical section through a change-speed gear.

Figure 8:
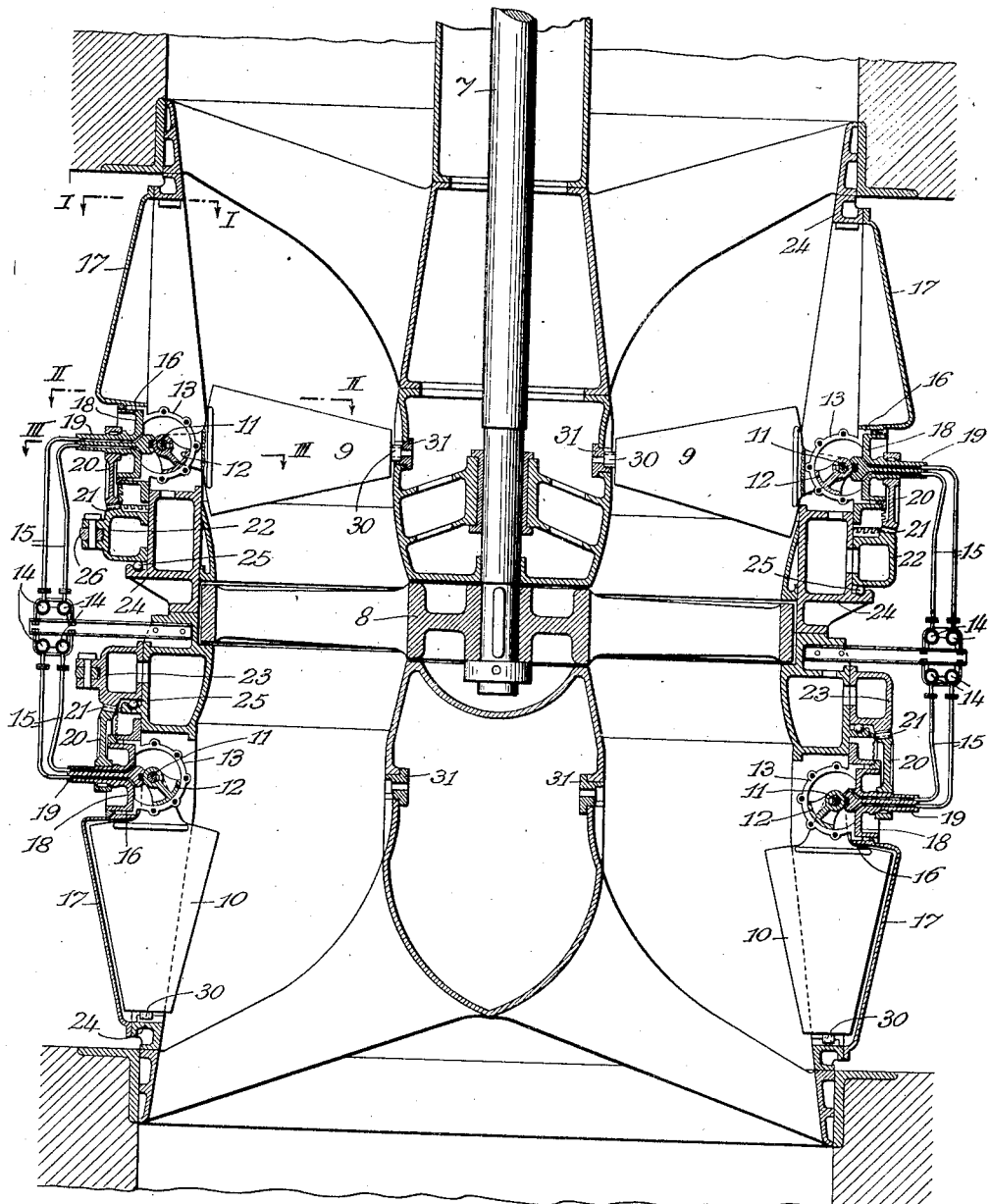
Fig. 8 is a longitudinal vertical section through the turbine.

In the drawings, 1 and 2 denote two turbines which act on a common asynchronous generator 3 by means of the spur-gear 4, 5 and 6 and the gear box 34. The turbines themselves are of the axial flow type and are provided with one upper and one lower guide apparatus, the rotary blades 9 and 10 of which pivoting round horizontal axes permit of an exact regulation of the load of the turbines. In the one direction of flow only one of the guide apparatus is operative, for example the upper one 9 (Fig. 4) with the direction of flow downwards and the lower one 10, (Fig. 5) with flow upwards. The blades of the inoperative apparatus are, by means of a suitable contrivance which is described hereinafter, turned out of the passages of the axial turbines and take up the temporary position represented in the drawing.

Referring to Figs. 8 and 9, 7 denotes the vertical shaft to which the runner 8 is rigidly fixed. The rotary vanes 9 and 10 of the upper and lower guide apparatus respectively are adapted to be rotated about the axles 11 for the purpose of being able to rotate the blades out of the water passage in which the parts of the turbine are arranged. In Fig. 8 the lower blades 10 are shown in the position into which they have been rotated in a downward direction. The contrivance for effecting this rotation of the guide blades is worked by fluid pressure in the following manner: a segment shaped piston 12 is rigidly fixed to the axle 11 and is enclosed in a casing 13. Pressure fluid can be supplied from either of the two main conduits 14 through two small pipes 15 leading to either side of the segment piston 12 of each guide blade—one of the pipes 15 and one of the main conduits 14 acting as escape for the pressure fluid whilst the latter is supplied to the other pipe and conduit. The fluid pressure causes a turning of the piston 12 inside the casing 13 and thereby of the guide blade in the desired manner. The foundation ring 24 is provided with apertures for taking up each guide blade in its turned position which apertures are closed by covers 17.

The turning motion of the guide blades around horizontal axes is effected from an automatic speed governor of any known type not shown in the accompanying drawings. To this end the axle 11 together with the casing 13 is rotatably mounted by means of a cylindrical portion 16 of the casing 13 guided in a cylindrical portion of the cover part 17. The opposite end of a guide blade is provided with a pin 30 which is supported in a bearing 31. The pin 30 is hollow and a spring loaded pin 32 is provided (shown in detail in Fig. 10) and adapted to enter into the hollow part of pin 30 for securing the pin 30 of the blade in position. The disengagement of pins 32 and 30 is caused by fluid pressure. Inside the cylindrical portion 16 a cover is provided which is fitted with a central extension 19 through which the bores leading to the pipes 15 pass. To that central extension 19 a toothed segment 20 is rigidly fixed, all the segments 20 for the blades of the upper guide apparatus being in engagement with the toothed part 21 of a regulating ring 22, while the segments 20 for the blades of the lower guide apparatus are actuated by a regulating ring 23. The regulating rings 22 and 23 are centrally guided on the frame 24 of the turbine, the load of the rings being supported on balls 25. If now the regulating ring of the guide apparatus the blades of which are in the operative position and which is linked by links 26 and 27 to a bell-crank lever 28 fitted to the vertical governor shaft 29 is turned around the axis of the turbine upon a turning motion being imparted to shaft 29 by the automatic speed governor all the guide blades will turn about their horizontal axes and will regulate the water passage between adjacent blades. A complete closing of the water passage can be effected by the guide blades.

When it is desired to completely open the water passages then the blades 9 and 10 of both guide apparatus are rotated out of the passage, as illustrated in Fig. 6, and there remains only the turbine rotor wheel, which as indicated above may be made use of as an axial pump. If, lastly, it be desired to close the passage completely then both guide apparatus are swung round into their operative position and then both closed (Fig. 7) whereby a perfectly watertight obturation of the passage in question results.

The gear box 34 illustrated in Figs. 1 and 2 of the drawings is of the type described in the British Patent No. 129271.

Another change speed gear for effecting an alteration in the transmission ratio between turbine and generator is diagrammatically illustrated in Fig. 11. To the generator shaft 35 a spurwheel 36 is rigidly fixed and to the turbine shaft or to the countershaft 37 carrying the pinion 5, the spider or disc 38 on which the axles 39 for the planet wheels 40, 41 are mounted is rigidly secured. The outer ends of the axles 39 are mounted in bearings 42, 43. A wheel 44 provided with internal toothing is rotatably mounted on the shaft 37, wheel 44 and planet wheel 42 and wheel 36 and planet wheel 40 respectively are cooperating. In order to provide for a different transmission ratio two locking devices 45 and 46 are fitted to the gear which devices may be fluid operated as indicated in the drawing. When the locking device 46 is operative the shafts 37 and 35 are directly coupled and an operative position of the locking device 45 causes the shaft 35 to be driven at a speed that is higher than the speed of the shaft 37, the planet wheel 41 rolling on the stationary wheel 44 and the planet wheel 40 causing the rotation of the wheel 36 and thereby of the generator shaft 35.

The operation of the tidal water-power plant is as follows the assumption being made that the minimum head at which the turbine has to work averages about 1 meter.

Turbines and generators run in one direction with a somewhat high revolution number depending on the rather large head. This head diminishes slowly so that the turbine has to be dropped to a lower speed, the voltage and periodicity of the current generated being maintained constant by effecting an alteration in the transmission ratio between the turbine and the generator, i. e., by operating the change speed gear. Then arrives the moment when the head measures only about 1 meter whereupon the generator must be disconnected. At this moment also the guide apparatus that is operative is put out of action and the generator converted to the motor by reducing its revolution number below the synchronous speed.

The speed of the generator, as compared to the synchronous speed, can easily be varied by the governor within the limits of 5% above or below, such range being more than sufficient to run it up to full load as generator and have it running as motor up to full absorption too. Indeed, generally, an over-speed of 3% is sufficient and a slip of 4% for the running as motor. The entire aggregate now continues running as motor and pump in the same direction as the generator did previously. As soon as the two water-levels on opposite sides of the dam are adjusted or, in practice, shortly before then the guide-apparatus are both closed and the motor is now only driving the wheel idly between two closed walls, and may, at the engineer's leisure during the interval that now ensues, be reversed so as to rotate in the other direction, that is, it may be first stopped and then started to run in the other direction. As soon as about 1 meter of head is available the set rotates as a motor in the new direction and it is only necessary to turn the outlet guide-apparatus completely away and to open the inlet guide-apparatus, to correspond in order to have the set running again as a turbine-generator, immediately the revolution number has been raised above that of the synchronous speed. As the head increases the aggregate continues to run thus and as soon as the head necessitates an increase in the revolution number of the turbine, it may be at once effected, the voltage and periodicity being maintained constant by the operations specified above and the aggregate again acting as a turbine-generator running with a high number of revolutions.

For the purpose of equalizing unfavourable low power factors in the asynchronous generators, suitable synchronous condensers are provided and at least one synchronous generator must act on the whole system so as to fix the periodicity.

The advantages attaching to such a tidal water-power plant are as follows:—

The guide-apparatus which can be put in and out of action and can also be regulated, produce a turbine of the best efficiency and adapted also to be well and easily regulated resulting therefore in a highly efficient utilization of tidal water-power.

Owing to the fact that the closing of the turbine channels can be effected by the guide-apparatus themselves a great saving is reached in the outlay for shut-off devices.

The putting out of action of the guide-apparatus produces a water passage through the dam in which the idle running-wheel offers only a slight resistance to the water flowing through. When the difference between the water-levels is quite small or just before re-adjustment must take place the volume of water flowing in this passage is increased by the running wheel working as a pump and the interval necessary for re-adjusting the water-levels is thus shortened. The employment of asynchronous generators is advantageous because no connecting in parallel is necessary and because by merely altering the number of revolutions so as to be above or below the revolution number of the synchronous generator, they may be made to act either as generators or motors.

I claim:

1. In a tidal water power plant, in combination, at least one aggregate composed of an asynchronous generator and a turbine, means interposed between said turbine and said generator for altering the transmission ratio between turbine and generator, two controllable guide apparatus for said turbine, means to render one of same operative when the turbine works in the one of the two rotary directions and to render the other inoperative by removing it from the supply passages to the turbine.

2. In a tidal water power plant, in combination, at least one aggregate composed of an asynchronous generator and a turbine of the axial type, mechanical means interposed between the shafts of said turbine and said generator for altering the transmission ratio between said shafts, two controllable guide apparatus for said turbine, means adapted to render one of said guide apparatus operative when the turbine works in the one of the rotary directions and to render the other guide apparatus inoperative by removing it from the supply passages to the turbine and to remove both guide apparatus for giving a perfectly free passage to the water through the turbine channel, and means adapted to influence the operative apparatus by an automatic speed governor.

3. In a tidal water power plant, in combination, at least one aggregate composed of an asynchronous generator and a turbine of the axial type, a change speed gear interposed between the shafts of said turbine and said generator for altering the transmission ratio between said shafts, two controllable guide apparatus for said turbine, means adapted to render one of said guide apparatus operative when the turbine works in the one of the rotary directions and to render the other guide apparatus inoperative by removing it from the supply passages to the turbine and to remove both guide apparatus for giving a perfectly free passage to the water through the turbine channel, and means adapted to influence the operative apparatus by an automatic speed governor.

In testimony whereof I affix my signature.

ALBERT HUGUENIN.